(12) United States Patent
Ramey et al.

(10) Patent No.: US 7,014,118 B1
(45) Date of Patent: Mar. 21, 2006

(54) MODULE HEADER APPARATUS

(75) Inventors: Samuel C. Ramey, Louisville, KY (US); Johannes Petrus Maria Kusters, New Albany, IN (US); John Paul Brainard, Louisville, KY (US)

(73) Assignee: Robinson Nugent, Inc, New Albany, IN (US)

( * ) Notice: Subject to any disclaimer, the term of this patent is extended or adjusted under 35 U.S.C. 154(b) by 0 days.

(21) Appl. No.: 09/529,032

(22) PCT Filed: Oct. 9, 1998

(86) PCT No.: PCT/US98/21292

§ 371 (c)(1),
(2), (4) Date: Apr. 5, 2000

(87) PCT Pub. No.: WO99/19941

PCT Pub. Date: Apr. 22, 1999

Related U.S. Application Data

(60) Provisional application No. 60/063,476, filed on Oct. 10, 1997.

(51) Int. Cl.
*G06K 7/00* (2006.01)

(52) U.S. Cl. ............... 235/486; 235/483; 235/479; 439/159; 439/160

(58) Field of Classification Search ............ 235/475, 235/482, 483, 484, 485, 486, 487, 492, 479; 361/399, 395; 439/159, 160, 157
See application file for complete search history.

(56) References Cited

U.S. PATENT DOCUMENTS

| | | | |
|---|---|---|---|
| 3,925,860 A | * | 12/1975 | Furuya ................ 24/687 |
| 4,091,440 A | * | 5/1978 | Gelin et al. ............ 361/796 |
| 4,197,572 A | | 4/1980 | Aimar |
| 4,457,050 A | * | 7/1984 | Kanzaka ................ 24/108 |
| 4,466,049 A | * | 8/1984 | Chaney et al. .......... 361/691 |
| 4,603,375 A | | 7/1986 | Miller et al. |
| 4,638,405 A | | 1/1987 | Smith |
| 4,780,792 A | | 10/1988 | Harris et al. |
| 4,952,161 A | | 8/1990 | Komatsu |
| 4,961,710 A | | 10/1990 | Komatsu |
| 4,996,631 A | | 2/1991 | Freehauf |
| 5,066,241 A | | 11/1991 | Hills |
| 5,115,376 A | | 5/1992 | Nakajima |
| 5,139,435 A | | 8/1992 | Komatsu et al. |

(Continued)

FOREIGN PATENT DOCUMENTS

EP     0 687 036 A2     6/1995

(Continued)

*Primary Examiner*—Karl D. Frech
*Assistant Examiner*—Daniel Walsh
(74) *Attorney, Agent, or Firm*—Melanie G. Gover

(57) ABSTRACT

A header connector apparatus (10) is configured to receive an electronic card (11). The apparatus (10) includes a body (12) having first and second spaced apart side arms (14, 16) formed integrally with the body (12) and configured to receive the card (11) therebetween. The first side arm (14) has a longitudinally extending first dovetail member (52). The apparatus (10) also includes an actuator button (48, 70) having a longitudinally extending second dovetail member (54, 74) configured to mate with the first dovetail member (52) to allow the button (48, 70) to move longitudinally relative to the body (12), and an ejector mechanism (36) coupled to the body (12) and the button (48, 70). The ejector mechanism (36) is configured to eject the card (11) from the body (12) upon longitudinal movement of the button (48, 70) relative to the body (12).

26 Claims, 10 Drawing Sheets

U.S. PATENT DOCUMENTS

| | | | | |
|---|---|---|---|---|
| 5,145,389 | A | 9/1992 | Okubo | |
| 5,149,276 | A | 9/1992 | Dixon | |
| 5,161,989 | A | 11/1992 | Okubo et al. | |
| 5,176,523 | A | 1/1993 | Lai | |
| 5,234,351 | A | 8/1993 | Dixon | |
| 5,275,573 | A | 1/1994 | McCleerey | |
| 5,286,207 | A | 2/1994 | McHugh | |
| 5,299,946 | A | 4/1994 | Kusakabe | |
| 5,374,198 | A * | 12/1994 | Nagata | 439/157 |
| 5,389,001 | A * | 2/1995 | Broschard et al. | 439/159 |
| 5,421,737 | A * | 6/1995 | Chen et al. | 439/157 |
| 5,466,166 | A * | 11/1995 | Law et al. | 439/159 |
| 5,470,241 | A * | 11/1995 | Kaufman et al. | 439/159 |
| 5,490,791 | A | 2/1996 | Yamada et al. | |
| 5,492,481 | A * | 2/1996 | Lewis | 439/159 |
| 5,503,564 | A | 4/1996 | Futatsugi et al. | |
| 5,507,658 | A * | 4/1996 | Ho | 439/159 |
| 5,533,906 | A * | 7/1996 | Abe | 439/159 |
| 5,591,047 | A | 1/1997 | Yamada et al. | |
| 5,597,316 | A * | 1/1997 | David et al. | 439/159 |
| 5,637,001 | A | 6/1997 | Nony et al. | |
| 5,653,603 | A * | 8/1997 | Sasao et al. | 439/159 |
| 5,683,258 | A * | 11/1997 | Takano et al. | 439/159 |
| 5,707,245 | A * | 1/1998 | Yamamoto et al. | 439/160 |
| 5,713,750 | A * | 2/1998 | Ho | 439/159 |
| 5,730,610 | A * | 3/1998 | Hsia et al. | 439/159 |
| RE35,938 | E * | 10/1998 | O'Brien et al. | 439/160 |
| 5,863,212 | A * | 1/1999 | Duesterhoeft | 439/160 |
| 5,899,758 | A * | 5/1999 | Yamamoto et al. | 439/77 |
| 5,899,763 | A * | 5/1999 | Kajiura | 439/159 |
| 5,967,810 | A * | 10/1999 | Spickler et al. | 439/159 |
| 5,967,811 | A * | 10/1999 | Yamamoto et al. | 439/159 |
| 5,993,227 | A * | 11/1999 | Hsia et al. | 439/159 |
| 6,030,238 | A * | 2/2000 | Dong | 439/159 |
| 6,033,243 | A * | 3/2000 | Kajiura | 439/159 |
| 6,036,511 | A * | 3/2000 | Hashimoto | 439/159 |
| 6,036,512 | A * | 3/2000 | Toshitaka | 439/159 |
| 6,042,402 | A * | 3/2000 | Tung et al. | 439/159 |
| 6,074,226 | A * | 6/2000 | Futatsugi et al. | 439/157 |
| 6,091,605 | A * | 7/2000 | Ramey et al. | 361/737 |
| 6,091,831 | A * | 7/2000 | Cho | 381/365 |
| 6,102,716 | A * | 8/2000 | Fusselman et al. | 439/157 |
| 6,102,719 | A * | 8/2000 | Tung | 439/159 |
| 6,102,720 | A * | 8/2000 | Tung | 439/159 |
| 6,106,313 | A * | 8/2000 | Chen | 439/159 |
| 6,145,747 | A * | 11/2000 | Wu | 235/486 |
| 6,174,192 | B1 * | 1/2001 | Watanabe et al. | 439/377 |
| 6,356,457 | B1 * | 3/2002 | Haworth | 361/801 |
| 6,364,674 | B1 * | 4/2002 | Kajiura | 439/159 |
| 6,482,030 | B1 * | 11/2002 | Kuo | 439/541.5 |
| 6,510,578 | B1 * | 1/2003 | Cyr et al. | 15/176.6 |
| 6,609,918 | B1 * | 8/2003 | Uchikawa | 439/159 |
| 2003/0114031 | A1 * | 6/2003 | Hu et al. | 439/159 |
| 2004/0018761 | A1 * | 1/2004 | Akasaka et al. | 439/159 |
| 2004/0067668 | A1 * | 4/2004 | Hirata et al. | 439/159 |
| 2004/0226150 | A1 * | 11/2004 | Beletsky | 24/625 |

FOREIGN PATENT DOCUMENTS

| | | |
|---|---|---|
| GB | 2 282 277 A | 3/1995 |
| WO | WO9530205 | * 11/1995 |
| WO | WO0687036 | * 12/1995 |
| WO | WO 97/07956 | 3/1997 |
| WO | WO9710691 | * 3/1997 |

* cited by examiner

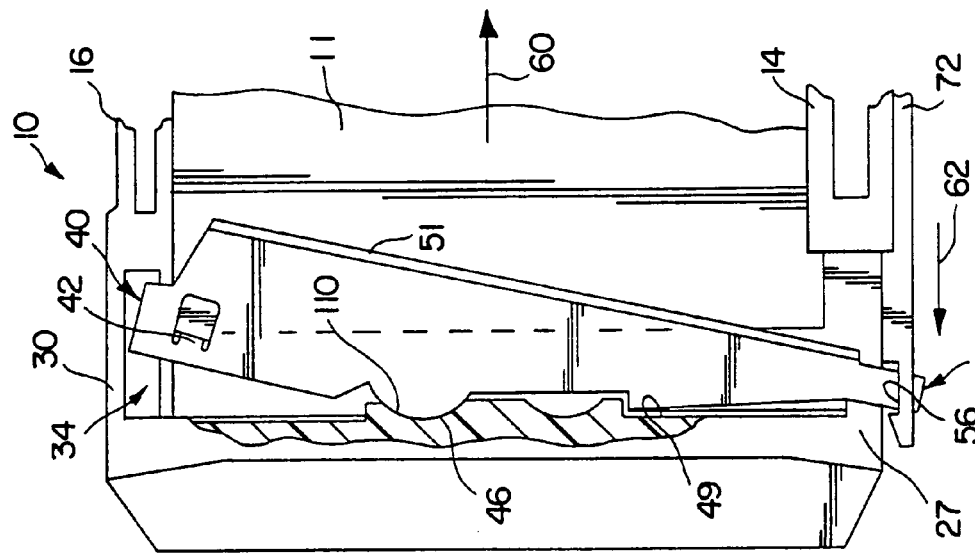

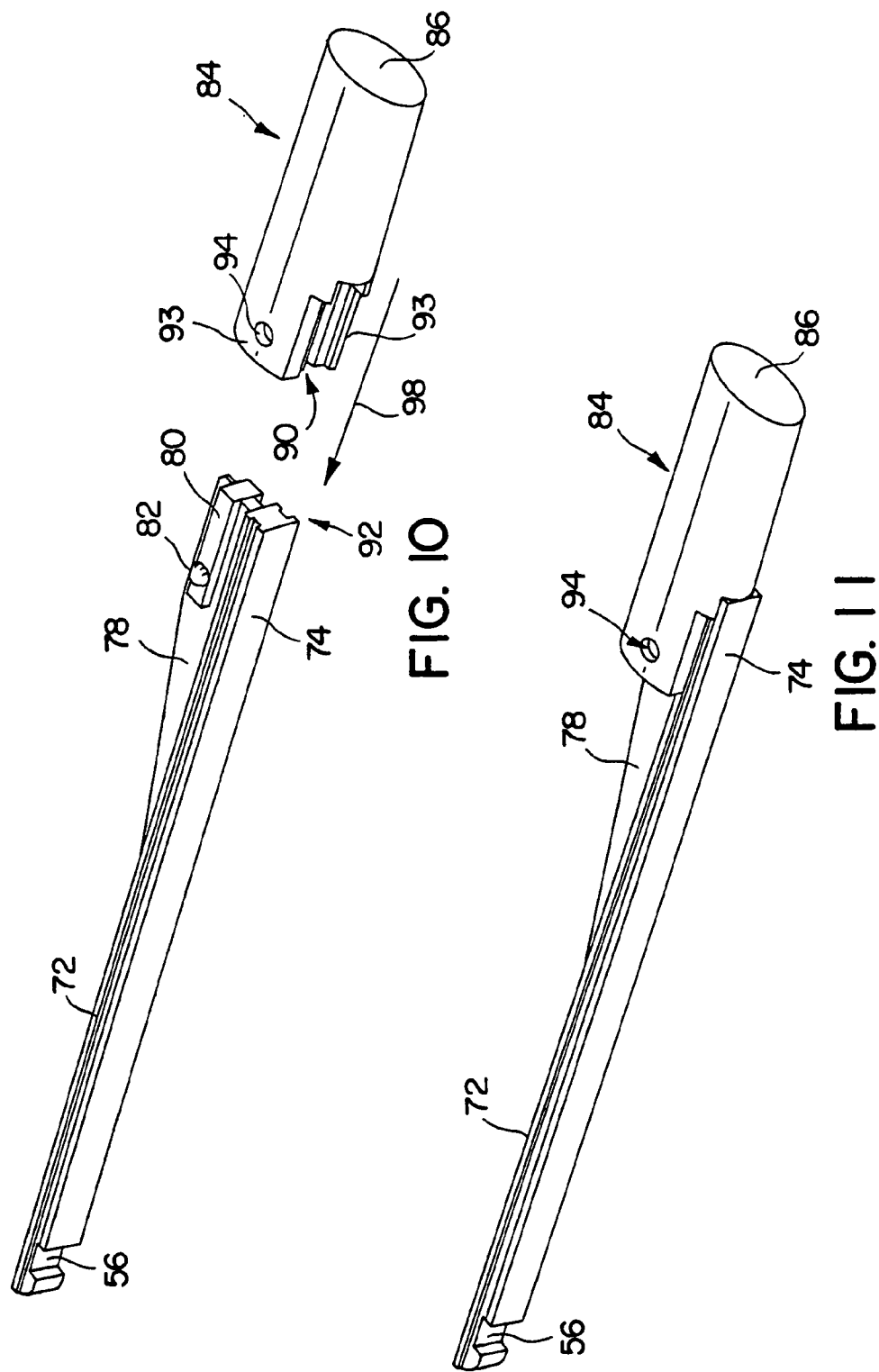

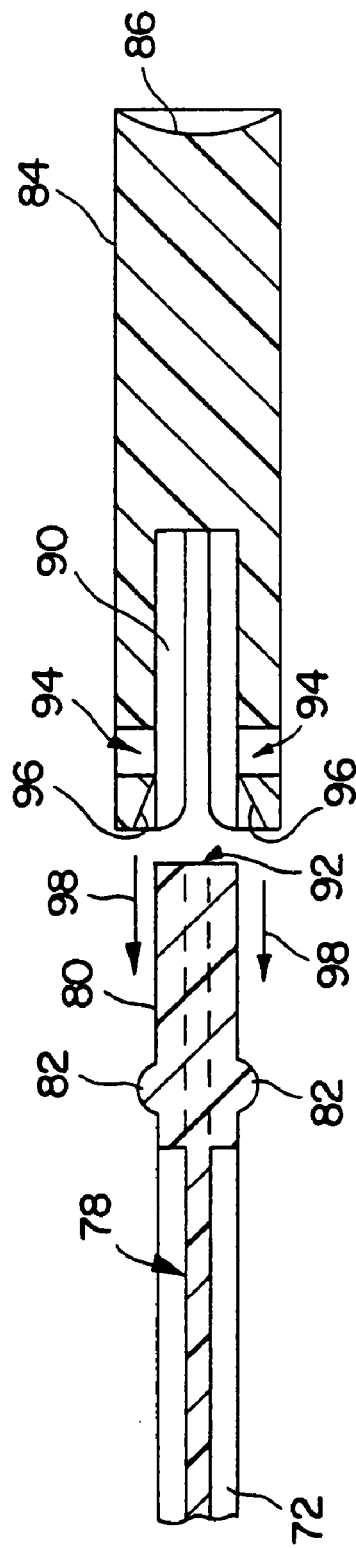
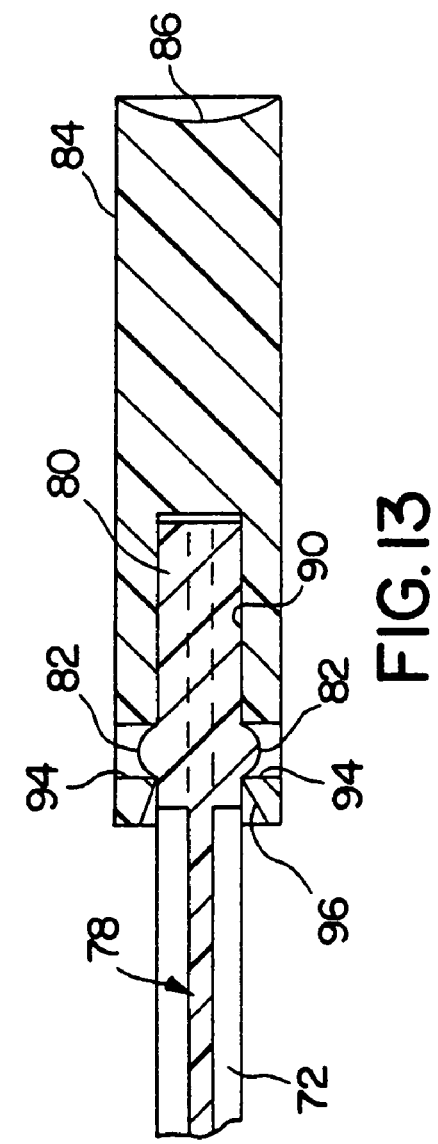

MODULE HEADER APPARATUS

CROSS-REFERENCES TO RELATED APPLICATIONS

This application is a U.S. national counterpart application of international application Ser. No. PCT/US98/21292 filed Oct. 9, 1998, which claims priority to U.S. provisional application Ser. No. 60/063,476 filed Oct. 10, 1997.

BACKGROUND AND SUMMARY OF THE INVENTION

The present invention relates to an improved header apparatus for receiving a PCMCIA module or card to make electrical connection with the card. More particularly, the present invention relates to an improved ejector mechanism for such header apparatus and an improved actuator for use with electrical connectors.

Memory cards, chip cards, or smart cards are typically data input devices which are connected to an electronic apparatus such as a personal computer or telephone. The data stored in the memory card is transferable into the electronic apparatus through an electrical connector coupled to the apparatus. The cards are movable from one apparatus to another.

Once the cards are inserted into a header connector, the cards have a relatively high extraction force to remove the cards from the header connectors. Therefore, several types of ejector mechanisms have been developed to remove the cards from the header connectors.

The present invention provides an improved ejector system for use with a card header connector. The header connector includes a main insulative frame. A push rod actuator or button is slidably coupled to one side of the frame. No separate rivets or pins are required to couple the button to the connector body or to a separate ejector mechanism which is actuated by the button. The ejector mechanism also does not require pegs or fasteners to secure the ejector to the body of the connector.

According to one aspect of the present invention, a header connector apparatus is configured to receive an electronic card. The apparatus includes a body having first and second spaced apart side arms formed integrally with the body and configured to receive the card therebetween. The first side arm has a longitudinally extending first dovetail member. The apparatus also includes an actuator button having a longitudinally extending second dovetail member configured to mate with the first dovetail member to allow the button to move longitudinally relative to the body, and an ejector mechanism coupled to the body and the button. The ejector mechanism is configured to eject the card from the body upon longitudinal movement of the button relative to the body.

In the illustrated embodiment, the ejector mechanism includes a pivot cam configured to engage the body so that movement of the button relative to the body causes the ejector mechanism to pivot about the pivot cam to eject the card. The illustrated button includes a notch and the ejector mechanism includes a flange. The notch is configured to receive a portion of the flange therein to couple the button to the ejector mechanism.

According to another aspect of the present invention, a header connector apparatus is configured to receive an electronic card. The apparatus includes a body having first and second spaced apart side arms configured to receive the card therebetween. The body is formed to include an opening adjacent the second arm. The apparatus also includes a button coupled to the first arm. The button is configured to move relative to the first arm. The button is formed to include a notch portion. The apparatus further includes an ejector mechanism having first and second opposite flanges. The first flange is located in the notch portion of the button to couple the ejector mechanism to the button. The second flange extends through the opening formed in the body adjacent the second arm. The ejector mechanism also has a pivot cam positioned between the first and second flanges so that movement of the button causes the ejector mechanism to pivot about the pivot cam to eject the card.

In the illustrated embodiment, the body includes a curved portion configured to receive the pivot cam. The pivot cam has a curved outer surface and the curved portion of the body has substantially the same radius as the outer surface of the pivot cam.

The illustrated body is formed to include a lip located between the first and second side arms. The lip is configured to extend over an edge of the ejector mechanism adjacent the cam. The illustrated ejector mechanism also includes a downwardly extending tab configured to engage an end edge of the card to eject the card from the header and an upturned front edge.

In the illustrated embodiment, the first flange includes a downwardly extending portion located in the notch and an outwardly extending portion located below the button. The opening in the body portion is formed by an elongated bar. The second flange is formed to include a downwardly extending portion extending through the opening and an outwardly extending portion extending under the bar.

According to yet another aspect of the present invention, an actuator button apparatus is provided for an electrical connector. The apparatus includes a first member coupled to the connector for movement relative to the connector to an actuation position, and a pressing part coupled to the first member. The pressing part is configured to be engaged by an operator to move the first member and the pressing part relative to the connector.

In the illustrated embodiment, an ejector mechanism coupled to the connector and the first member of the button. The ejector mechanism is configured to eject an electronic card from the connector upon movement of the first member and the pressing part relative to the connector.

Also in the illustrated embodiment, at least one detent is formed on one of the first member and the pressing part to secure the first member to the pressing part upon insertion of the pressing part on to the first member. The illustrated detent includes a domed surface formed on the first member which is configured to enter an aperture formed in the pressing part.

The pressing part includes first and second spaced apart spring arms. Each spring arm is formed to include an aperture therein. The first member includes upper and lower domed surfaces configured to enter the apertures in the spring arms upon insertion in the pressing part on to the first member.

The first member is formed to include a guide bar, and the pressing part is formed to include a slot configured to slide over the guide bar of the first member to couple the pressing part to the first member. The illustrated guide bar and the slot each have generally rectangular shapes. The pressing part includes at least one lead-in ramp surface adjacent the slot to facilitate installation of the pressing part over the first member.

Additional objects, features, and advantages of the invention will become apparent to those skilled in the art upon consideration of the following detailed description of the illustrated embodiment exemplifying the best mode of carrying out the invention as presently perceived.

BRIEF DESCRIPTION OF THE DRAWINGS

The detailed description particularly refers to the accompanying figures in which:

FIG. 8 is a top plan view with portions broken away illustrating the position of the ejector mechanism when the card is fully inserted into the header;

FIG. 9 is a to plan view similar to FIG. 8 illustrating movement of the ejector mechanism by the button to eject the card from the header;

FIG. 10 is an exploded perspective view further illustrating the two parts of the button assembly in which the pressing part is separated from the sliding part;

FIG. 11 is a perspective view similar to FIG. 10 in which the pressing part is installed on the sliding part of the button;

FIG. 12 is a sectional view illustrating further details of the sliding part and pressing part of the button; and FIG. 13 is a sectional view taken through the assembled button of FIG. 11 illustrating further details of the structure for coupling of the sliding part of the button to the pressing part of the button.

DETAILED DESCRIPTION OF THE DRAWINGS

Figure 1:
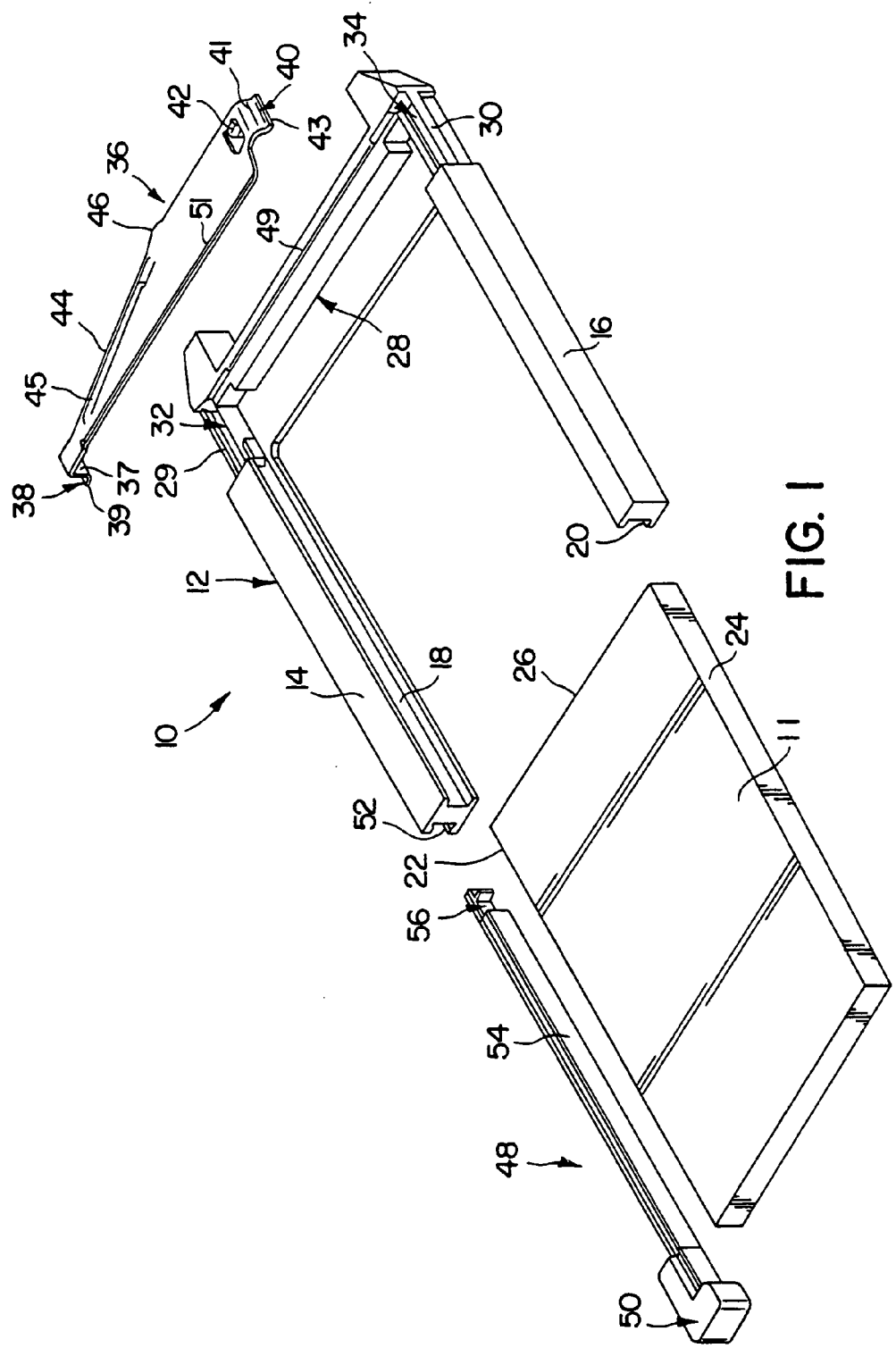
FIG. 1 is an exploded perspective view of a header connector configured to receive a module or card which includes an ejector apparatus for ejecting the module or card.

Referring now to the drawings, FIG. 1 illustrates a header connector apparatus 10 configured to receive a module or IC card 11. The header connector 10 includes an insulative plastic body 12 having integrally formed, spaced apart side arms 14 and 16. Therefore, separate side arms do not have to be installed on the body during assembly. Side arms 14 and 16 are formed to include inwardly facing U-shaped grooves 18 and 20, respectively, which are configured to receive opposite sides 22 and 24 of card 11 during insertion of the card 11 into the header connector 10. A leading end 26 of card 11 includes contacts (not shown) configured to engage terminal pins 27 (see FIG. 6) located along a contact portion 28 of header connector 10 in a conventional manner.

Insulative plastic body 12 is formed to include bars 29 and 30 which define openings 32 and 34 adjacent contact portion 28. The connector 10 also includes an ejector mechanism 36 which is illustratively stamp formed from a sheet metal material. Ejector mechanism 36 includes opposite curved flanges 38 and 40. Flange 38 includes a downwardly extending portion 37 and an outwardly extending portion 39. Flange 40 includes a downwardly extending portion 41 and an outwardly extending portion 43. Ejector mechanism 36 also includes a downwardly extending tab 42 which is configured to engage end 26 of card 11. Ejector mechanism 36 further includes a ramp surface 44 and pivot cam 46 which engages a ledge 49 on the plastic body 12 as shown in FIG. 9. In addition, ejector mechanism 36 includes an upturned front edge 51 which provides structural integrity and also provides a lead-in surface for insertion of the card 11.

Figure 2:
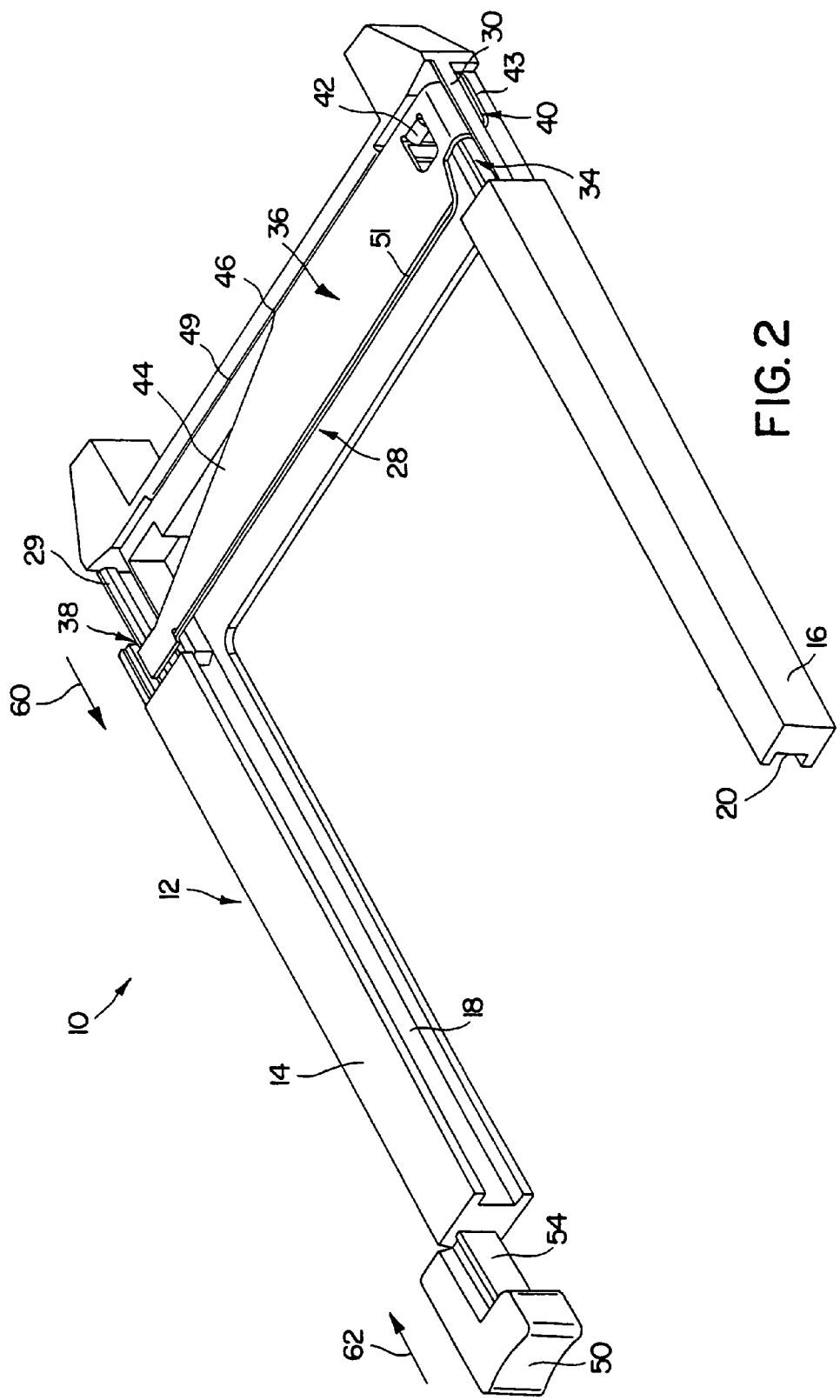
FIG. 2 is a perspective view illustrating further details of the ejector mechanism coupled to an insulative plastic body of the connector, with the push rod or button of the ejector being extended from the connector body in its position when the card is inserted into the header connector.
Figure 3:
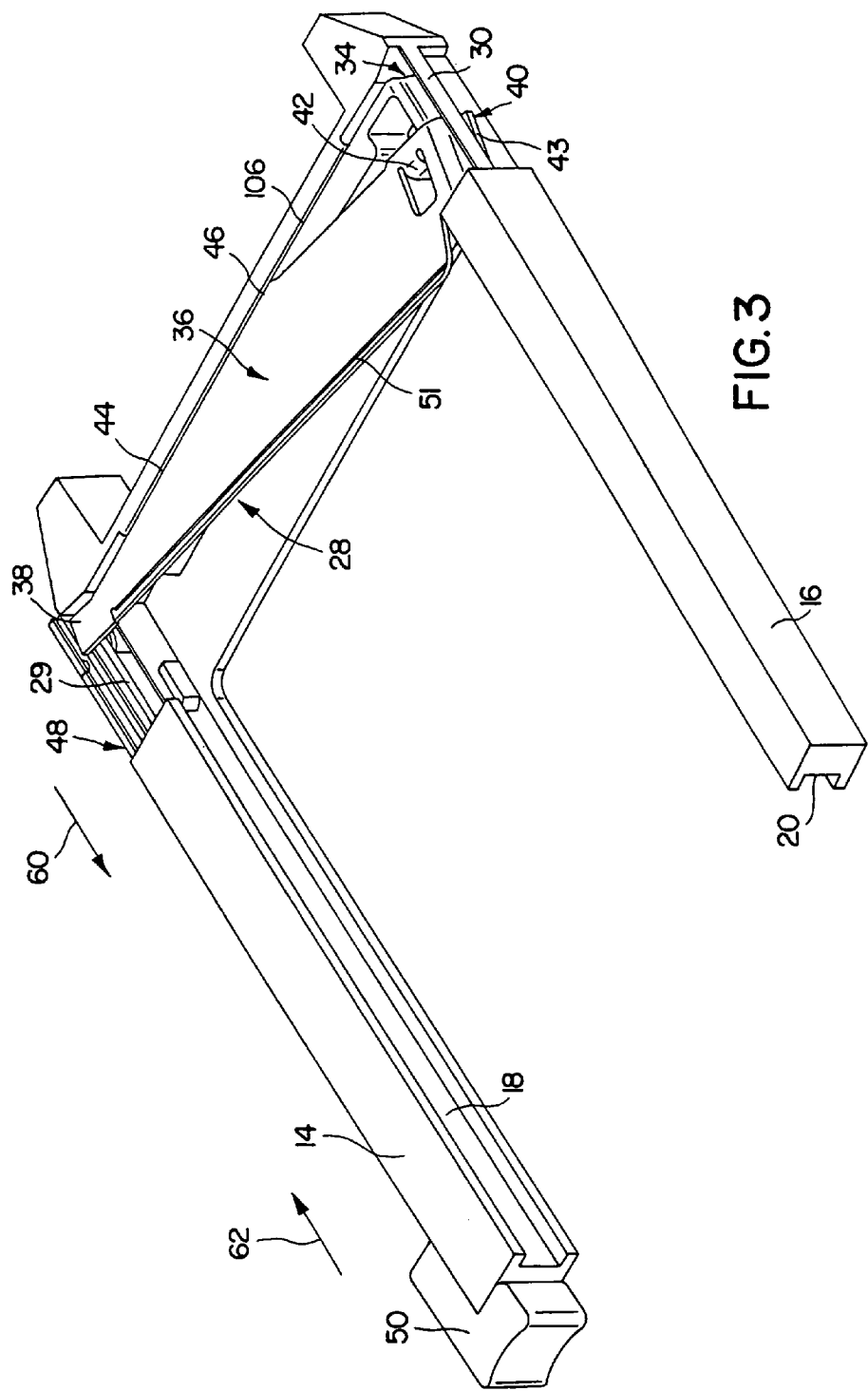
FIG. 3 is a perspective view similar to FIG. 2 illustrating movement of the ejector mechanism to eject a card.
Figure 4:
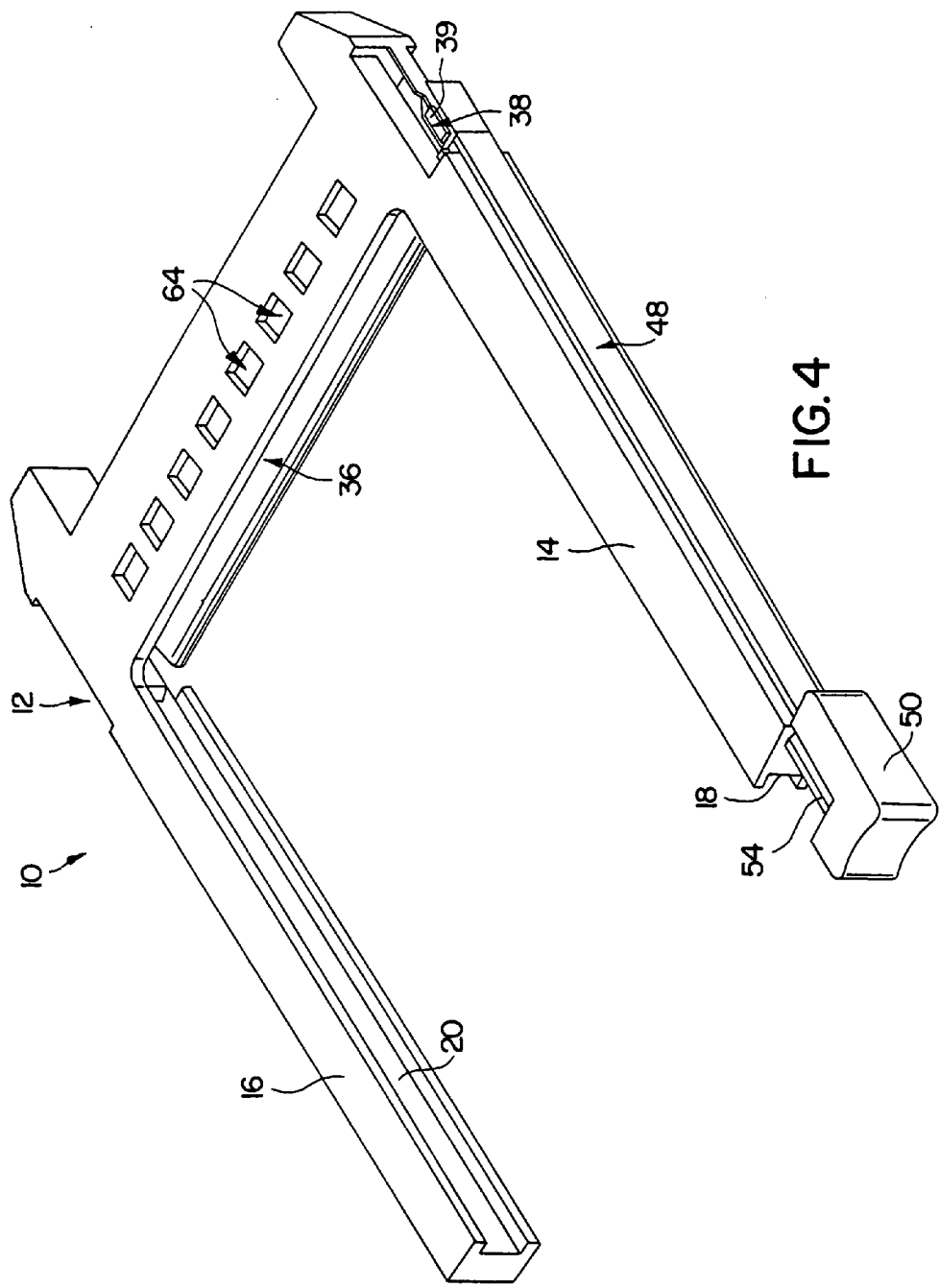
FIG. 4 is a perspective view of a bottom side of the header connector with the button extended when a card is inserted into the connector.
Figure 5:
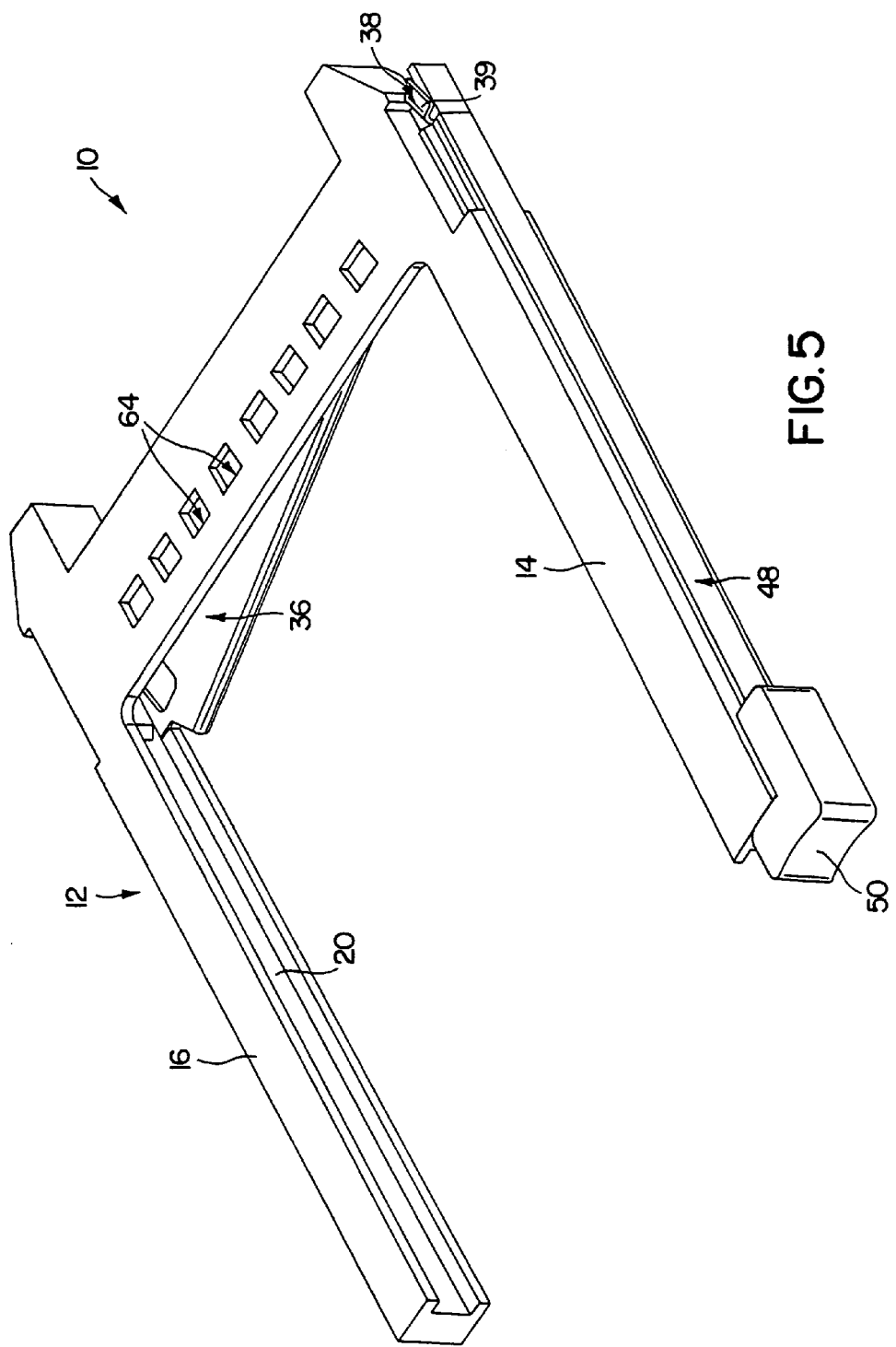
FIG. 5 is a perspective view of the bottom side of the connector similar to FIG. 4 in which the button has been pushed inwardly to eject the card from the connector.

In the embodiment of FIGS. 1–5, header connector 10 further includes a one-piece push rod or button 48 having a head 50 which provides an actuator for an operator to push in order to eject the card 11 from the header connector 10 as discussed below. Side arm 14 of connector body 12 is formed to include a female dovetail 52. Button 48 is formed to include a male dovetail 54 configured to slide within female dovetail 52 to couple the button 48 to the connector body 12. No fasteners are required to couple the connector body 12 to the button 48. An end of button 48 spaced apart from head 50 is formed to include a notch 56. The notch 56 is configured to receive the downwardly extending portion 37 of flange 38 therein. Outwardly extending portion 39 of flange 38 overlaps a side wall of the button 48 as best shown in FIGS. 4 and 5 to couple the ejector mechanism 36 to the button 48.

The flange 38 is configured to fit over bar 28 as illustrated in FIGS. 2 and 3. In another embodiment shown in FIGS. 6 and 7, bar 28 which defines the opening 32 is not provided. Instead, a solid surface 27 is formed on the connector body 12 on the side of the button 48. The flange 40 is interlocked with bar 30 by insertion of the flange 40 into the opening 34 as also illustrated in FIGS. 2 and 3. Portion 41 of flange 40 extends downwardly through the opening 34. Outwardly extending portion 43 of flange 40 extends under the bar 30 to couple the ejector mechanism 36 to the body 12.

FIG. 2 illustrates the assembled header connector 10 in a position when the card 11 is fully inserted into the connector. For clarity, the card 11 is not shown in FIGS. 2–5. When the card 11 is inserted, the end 26 of card 11 engages the tab 24 to move the ejector 36 to the position of FIG. 2. This causes the ejector 36 to pivot about pivot cam 46 to move the flange 38 in the direction of arrow 60. Pivoting movement of cam 46 is described below with reference to FIGS. 8 and 9. Since section 37 of flange 38 is located within notch 56 of button 48, button 48 slides within arm 14 to an outwardly extended position shown in FIGS. 2 and 4 as the flange 38 moves in the direction of arrow 60 during insertion of the card 11.

When it is desired to eject the card 11 from connector 10, the head 50 of button 48 is pushed inwardly toward the connector body 12 in the direction of arrow 62. This causes pivotable movement of the ejector 36 about pivot cam 46 to the position shown in FIGS. 3 and 5. Tab 42 pushes the end 26 of card 11 in the direction of arrow 60 to eject the card 11 from the header connector 10.

FIGS. 4 and 5 illustrate the plurality of apertures 64 formed in the connector body. The apertures 64 allow a card bus ground fingers (not shown) to make contact with a receptacle shield (not shown). The card bus shield is configured to be positioned over the connector body 12 adjacent apertures 64.

The ejector mechanism 36 of the present invention does not require the use of separate rivets or pins to perform rotation of the ejector mechanism 36 or to couple the button 48 or ejector 36 to the connector body 12. This facilitates manufacture and assembly of the header connector 10. The header connector 10 of the present invention also has a low profile and small outline. The dovetail ejector button 48 also facilitates maintaining a smaller outline of the connector 10. The dovetail interlock between the button 48 and the side arm 14 provides stability and strength for the ejector arm and permits formation of the ejector from a plastic material. The arms 14 and 16 are integrally formed with the body 12, and the ejector button 48 is easily installed into an end of arm 14 which reduces assembly costs. No rivets or pins are needed to attach the ejector mechanism 36 to the button 48.

Figure 6:
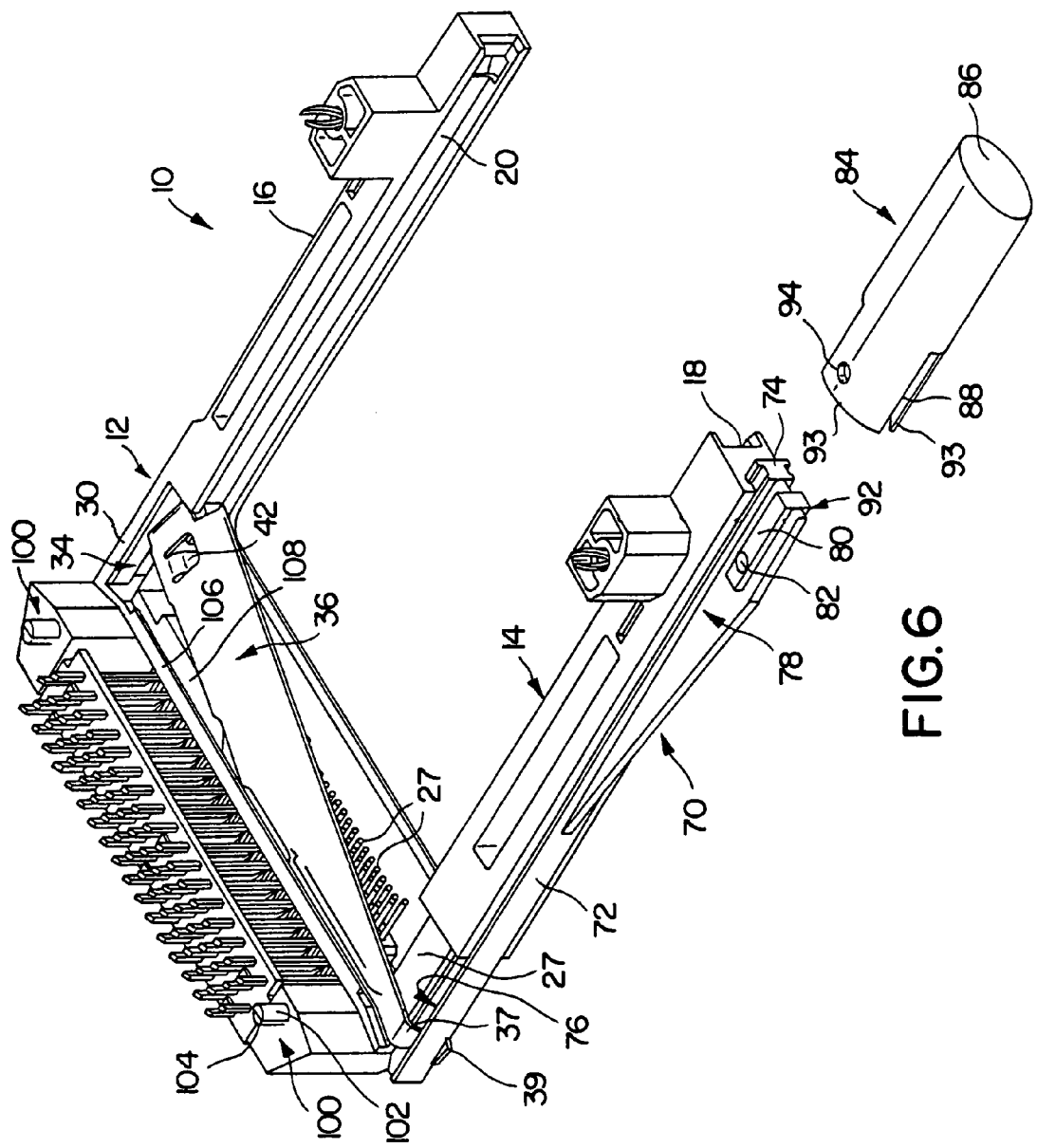
FIG. 6 is a perspective view of another embodiment of the present invention which includes a two piece button assembly for actuating the ejector mechanism.
Figure 7:
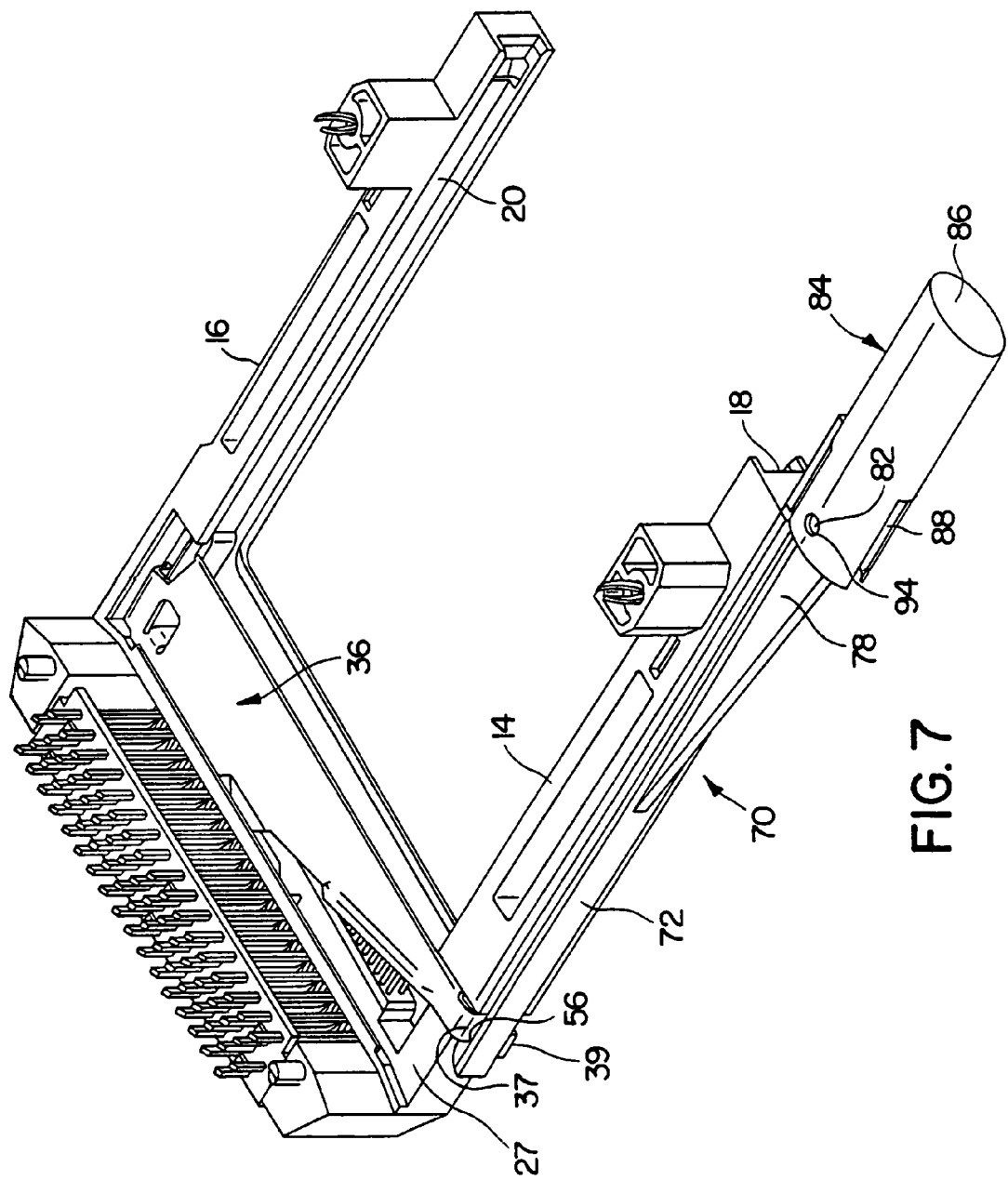
FIG. 7 is a perspective view similar to FIG. 6 in which a pressing part of the button has been coupled to a sliding part of the button.

Another embodiment of the present invention is illustrated in FIGS. 6 and 7. Those numbers referenced by numbers the same as FIGS. 1–5 perform the same or similar function. In the embodiment of FIGS. 6 and 7, a two piece actuator or button assembly 70 is provided. Button assembly 70 includes a sliding part 72 formed to include a male dovetail 74 and a notch 76. Sliding part 72 also includes a mounting section 78 having a rectangularly-shaped guide bar 80. Domed portions 82 are formed on top and bottom surfaces of guide bar 80 as best shown in FIGS. 12 and 13. Button assembly 70 further includes a press part 84 having an end surface 86 configured to be pushed by an operator to eject a card 11. Press part 84 includes an opening having side slots 88 and a central rectangular slot portion 90 configured to slide over an end 92 of sliding part 72. Press part 84 includes spring arms 93 formed to include top and bottom apertures 94 which are configured to slide over and receive dome portions 82 on sliding part 72 to couple the press part 84 to the sliding part 72 as illustrated in FIGS. 12 and 13. Press part 84 includes lead in ramp surfaces 96 to facilitate installation of the press part 84 over the end 92 of sliding part 72 in the direction of arrows 98 in FIG. 12.

The two piece button assembly 70 simplifies the assembly process for the memory card header 10. The header 10 having the sliding part 72 coupled to the side arm 14 of plastic body 12 can be assembled on to the printed circuit board either with or without the press part 84. Header 10 includes split pegs 100 having fixed posts 102 and spring arms 104 to retain the header 10. Without the press part 84, the connector 10 decreases space of a long button sticking out of the printed circuit board. In addition, the press part 84 may be assembled after assembling the application a front panel of a device. The two piece button assembly 70 provides more freedom in the total assembly process or sequence.

The two piece button assembly 70 further permits selecting different press part 84 configurations based on customer requests. Therefore, special button shapes, lengths, colors, textures, text, etc. may be provided on the press part 84 while the sliding part 72 remains uniform. In other words, the sliding part 72 is a standard part for all connectors while the press part 84 can be changed based on customer request.

The press part 84 is easily installed on the sliding part 72 by sliding it over the end 92 the sliding part 72 in the direction of arrows 98 of FIG. 12. Top and bottom arms 93 ramp apart so that the arms slide over domes 82. The arms 93 snap over the domes 82 when apertures 94 are aligned with the domes 82 to lock the press part 84 and the sliding part 72 together. It is understood that the domes 82 may be formed on the press part 84, if desired. In addition, another suitable detent or latch may be used to secure the sliding part 72 to the press part 84. A click indicates when the press part 84 is seated over the domes 82 of the sliding part 72. The press part 84 can be removed from the sliding part 72 for disassembly or customer design change.

Illustratively, the press part 84 is formed from a thermoplastic material with color, shape, length, texture being changed for customer requests. The sliding part 72 is also a thermoplastic material and is typically a standard color. As discussed above, the press part 84 can be assembled on the sliding part 72 before assembly of the header connector 10 on to the printed circuit board or after assembly of the header connector on to the printed circuit board. Other assembly sequences are possible. The press part 84 also provides easy disassembly of the header connector 10.

FIGS. 6–9 illustrate further details of the pivoting movement of ejector mechanism 36. Plastic body 12 includes a lip portion 106 defining a gap above surface 108 for receiving an end edge of the ejector mechanism 36. The lip 106 prevents the ejector mechanism 36 from slipping out of position or twisting during movement of the ejector mechanism 36. The cam 46 of ejector mechanism 36 pivots within a curved portion 110 formed on header 10 configured to receive the cam 46. The radius of curved portion 110 substantially matches the radius of cam 46. Curved or rounded portion 110 prevents the cam from slipping during actuation. As the ejector button 48 or 70 is pushed in the direction of arrow 62, ejector mechanism 36 pivots about the cam 46 in curved portion 110 to the position shown in FIG. 9 to eject the card 11. Tab 42 pushes end edge 26 of the card outwardly in the direction of arrow 60 to eject the card 11 from the header 10. A second curved portion 112 is provided in case the ejector mechanism is to be reversed with the button 48, 70 on the second arm 16.

What is claimed is:

1. A header connector apparatus configured to receive an electronic card, the apparatus comprising:
a body having first and second spaced apart side arms formed integrally with the body and configured to receive the card therebetween, the first side arm having a longitudinally extending first dovetail member;
an actuator button having a longitudinally extending second dovetail member configured to mate with the first dovetail member to allow the button to move longitudinally relative to the body; and
a monolithic ejector mechanism coupled to the body and the button, the monolithic ejector mechanism having a protrusion, said protrusion sliding against a wall of the body to eject the card from the body upon longitudinal movement of the button relative to the body;
wherein the body is formed to include an opening adjacent the second arm, the button is formed to include a notch portion, and the ejector mechanism includes first and second opposite flanges, the first flange being located in the notch portion of the button to couple the ejector mechanism to the button, and the second flange extending through the opening formed in the body adjacent the second arm, the protrusion including a pivot cam positioned between the first and second flanges so that movement of the button causes the ejector mechanism to pivot about the pivot cam to eject the card; and
wherein the wall of the body includes a curved portion configured to receive and slide against the pivot cam.

2. The header connector apparatus of claim 1, wherein the protrusion includes a pivot cam configured to slide against the wall of the body so that movement of the button relative to the body causes the ejector mechanism to pivot about the pivot cam to eject the card.

3. The header connector apparatus of claim 2, wherein the button includes a notch and the ejector mechanism includes a flange, the notch being configured to receive a portion of the flange therein to couple the button to the ejector mechanism.

4. The header connector apparatus of claim 1, wherein the monolithic ejector mechanism is stamp formed from a sheet of metal material.

5. The apparatus of claim 1, wherein the body is formed to include a lip located between the first and second side arms, the lip being configured to extend over an edge of the ejector mechanism adjacent the cam.

6. The apparatus of claim 1, wherein the first flange includes a downwardly extending portion located in the notch and an outwardly extending portion located below the button, and the opening in the body portion is formed by an elongated bar, the second flange being formed to include a downwardly extending portion extending through the opening and an outwardly extending portion extending under the bar.

7. The apparatus of claim 1, wherein the button includes a first member coupled to the first side arm of the body, and a pressing part coupled to the first member, the pressing part being configured to be engaged by an operator to move the first member and the pressing part relative to the body.

8. The apparatus of claim 7, further comprising at least one detent formed on one of the first member and the pressing part to secure the first member to the pressing part upon insertion of the pressing part on to the first member.

9. The apparatus of claim 8, wherein the detent includes a domed surface formed on the first member which is configured to enter an aperture formed in the pressing part.

10. The apparatus of claim 7, wherein the pressing part includes first and second spaced apart spring arms, each spring arm being formed to include an aperture therein, and the first member includes upper and lower domed surfaces configured to enter the apertures in the spring arms upon insertion in the pressing part on to the first member.

11. The apparatus of claim 7, wherein the pressing part includes a slot configured to slide over an end of the first member, the pressing part including at least one lead-in ramp surface adjacent the slot to facilitate installation of the pressing part over the first member.

12. A header connector apparatus configured to receive an electronic card, the apparatus comprising:
a body having first and second spaced apart side arms configured to receive the card therebetween, the body being formed to include an opening adjacent the second arm;
a button coupled to the first arm, the button being configured to move relative to the first arm, the button being formed to include a notch portion; and
a monolithic ejector mechanism having first and second opposite flanges, the first flange being located in the notch portion of the button to couple the ejector mechanism to the button, the second flange extending through the opening formed in the body adjacent the second arm, the ejector mechanism also having a pivot cam positioned between the first and second flanges so that movement of the button causes the ejector mechanism to slide against a wall of the body and pivot about the pivot cam to eject the card;
wherein the body includes a curved portion configured to receive and slide against the pivot cam.

13. The apparatus of claim 12, wherein the pivot cam has a curved outer surface and the curved portion of the body has substantially the same radius as the outer surface of the pivot cam.

14. The apparatus of claim 12, wherein the body is formed to include a lip located between the first and second side arms, the lip being configured to extend over an edge of the ejector mechanism adjacent the cam.

15. The apparatus of claim 12, wherein the ejector mechanism includes a downwardly extending tab configured to engage an end edge of the card to eject the card from the header.

16. The apparatus of claim 12, wherein the ejector mechanism includes an upturned front edge.

17. The apparatus of claim 12, wherein the ejector mechanism includes a ramp surface adjacent the first flange.

18. The apparatus of claim 17, wherein the ejector mechanism includes a stop located adjacent the ramp surface.

19. The apparatus of claim 12, wherein the first flange includes a downwardly extending portion located in the notch and an outwardly extending portion located below the button.

20. The apparatus of claim 12, wherein the opening in the body portion is formed by an elongated bar, the second flange being formed to include a downwardly extending portion extending through the opening and an outwardly extending portion extending under the bar.

21. The apparatus of claim 12, wherein the first side arm includes a longitudinally extending first dovetail member, and the button includes a longitudinally extending second dovetail member configured to mate with the first dovetail member to allow the button to move longitudinally relative to the body.

22. The apparatus of claim 12, wherein the button includes a first member coupled to the first side arm of the body, and a pressing part coupled to the first member, the pressing part being configured to be engaged by an operator to move the first member and the pressing part relative to the body.

23. The apparatus of claim 22, further comprising at least one detent formed on one of the first member and the pressing part to secure the first member to the pressing part upon insertion of the pressing part on to the first member.

24. The apparatus of claim 22, wherein the detent includes a domed surface formed on the first member which is configured to enter an aperture formed in the pressing part.

25. The apparatus of claim 22, wherein the pressing part includes first and second spaced apart spring arms, each spring mm being formed to include an aperture therein, and the first member includes upper and lower domed surfaces configured to enter the apertures in the spring arms upon insertion in the pressing part on to the first member.

26. The apparatus of claim 22, wherein the pressing part includes a slot configured to slide over an end of the first member, pressing part including at least one lead-in ramp surface adjacent the slot to facilitate installation of the pressing part over the first member.

* * * * *

UNITED STATES PATENT AND TRADEMARK OFFICE
CERTIFICATE OF CORRECTION

PATENT NO. : 7,014,118 B2
APPLICATION NO. : 09/529032
DATED : March 21, 2006
INVENTOR(S) : Samuel C. Ramey It is certified that error appears in the above-identified patent and that said Letters Patent is hereby corrected as shown below:

Title Page Item (73) (Assignee), After "Inc," insert -- 800 East Eight Street, --

Column 7, line 7, in claim 4, before "ejector" delete "monolithic".

Column 8, line 47, in claim 24, delete "claim 22" and insert -- claim 23 --, therefore.

Column 8, line 52, in claim 25, delete "mm" and insert -- arm --, therefore.

Signed and Sealed this

Seventh Day of November, 2006

JON W. DUDAS
*Director of the United States Patent and Trademark Office*